United States Patent [19]
Luedtke et al.

[11] 4,091,386
[45] May 23, 1978

[54] REAR WINDOW DIRECTION FINDING ANTENNA

[75] Inventors: Arthur Luedtke, Marietta; William Ferrel Bentley, Smyrna, both of Ga.

[73] Assignee: Field Operations Bureau of the Federal Communications Commission, Washington, D.C.

[21] Appl. No.: 802,845

[22] Filed: Jun. 2, 1977

Related U.S. Application Data

[63] Continuation-in-part of Ser. No. 610,708, Sep. 10, 1975, Pat. No. 4,003,057.

[51] Int. Cl.² .............................................. H01Q 1/32
[52] U.S. Cl. .................................. 343/713; 343/729; 343/876; 343/120
[58] Field of Search ............... 343/704, 713, 729, 852, 343/853, 854, 876, 120

[56] References Cited
U.S. PATENT DOCUMENTS 4,063,247  12/1977  Sakurai et al. ........................ 343/713

Primary Examiner—Eli Lieberman
Attorney, Agent, or Firm—W. Ferrel Bentley

[57] ABSTRACT

A plurality of antennas attached to the glass of the rear window of a vehicle produces patterns that may be combined to give directional pick up patterns. The first basic antenna is two spaced vertical whip antennas connected by parallel horizontal delay lines. Each whip output has a cardioid pick up pattern in the direction of the other antenna, in this case to the right and left. The second antenna is connected vertically across the window opening. Its output has a figure eight pick up pattern, typical of a slot antenna, with the lobes to the front and rear of the vehicle. The phase relationship of these three pick up patterns are such that if properly combined, then either of two sets of pick up patterns can be obtained. The first pattern is the basic right and left cardioid, and the second pattern is the front and rear cardioids. When used in combination with a communications receiver and processor, the direction of the transmitter can be determined, regardless of which quadrant it lies.

10 Claims, 6 Drawing Figures

RF PICKUP PATTERN

SUM HYBRID

SUM + DIFFERENCE HYBRID

REAR WINDOW DIRECTION FINDING ANTENNA

CROSS REFERENCES TO RELATED APPLICATIONS

This antenna is used in a directional system for mobile DF'ing, and is a continuation in part to application Ser. No. 610,708 for Rear Window DF antenna Filed 9-10-75, now U.S. Pat. No. 4,003,057. The outputs of this antenna are used with the Mobile Directional Comparator application Ser. No. 611,954 filed 9-10-75, now U.S. Pat. No. 4,025,924.

BACKGROUND OF THE INVENTION

This invention relates generally to improvements in a concealed vehicle antenna which is used for direction finding. In particular, it pertains to a new and improved antenna wherein the antenna is mounted in the rear window opening with the appearance of a rear window defroster. A specific embodiment illustrating the present invention comprises a vehicle window with the antenna carried on the surface of the window glass. The antenna is preferably flat rectangular copper strips, the horizontal lines are attached in such a manner to the two end verticals as to provide a continuous electrical circuit for reception or transmission of radio signals, and insulated from the center vertical, so that both can act as an independent antenna.

DESCRIPTION OF THE PRIOR ART

Those concerned with the development of antennae, particularly mobile direction finding antennae have long recognized the need for eliminating conspicuous unsightly antennae mounted and extending from a vehicle body. In the past, mobile direction finding antennae would comprise a Finch Loop or other suitable antennae mounted in the center of the vehicle presenting a conspicious unaesthetic antennae. Direction finding antennae attached to the outside of the automobile body present mechanical and electrical problems besides attracting visual attention to the vehicle. The use of antennae in automobile windows is found in U.S. Pat. Nos. 3,414,902 and 3,484,584 issued to Hugh E. Shaw, Jr., on Dec. 3, 1968 and Dec. 16, 1969, respectively. Both patents disclose antennae that are laminated between two layers of glass of an automobile window. These are typical of the prior art in that they are intended as antennas for reception of commercial or entertainment signals and for that requirement an omnidirectional reception pattern is desired. There is no disclosure for horizontal matching lines or directional cardioid type patterns.

SUMMARY OF THE INVENTION

The object of the present invention is to provide an antenna that is suitable for direction finding of unknown radio frequency signal transmission sources. It is to be installed in the rear window of the vehicle giving the appearance of a rear window defroster such that it would be inconspicuous to the casual observer. Another object is that the antenna patterns should be able to define the direction with no ambiguities. This antenna is a two element antenna with three outputs which are phase related such that the desired information can be obtained if properly processed. The first element is a basic homing antenna as defined in application Ser. No. 610,708 Rear Window Defroster Antenna filed 9-5-75. It has two vertical whip elements connected at the top by a plurality of interconnecting parallel horizontal wires. These horizontal cross wires function as a delay line and for the purpose of impedance determination the grid work covers 60 to 80% of the window opening. Each vertical whip element combines its own pick up with that of the other whip element which is phase delayed by the delay lines. The lower end portions of the parallel vertical wire spaced whip elements are the outputs for the first part of the antenna. Each of these two outputs has a cardioid reception pattern in the direction of the other whip antenna therefore producing two opposed cardioid patterns to the right and left of the vehicle. The second element of this invention comprises a vertical wire connected across the center of the rear window. The lower end portion of this wire is the output and it provides a figure eight reception pattern with lobes in the direction of the vehicle's motion. Both element one and two are to be symmetrical with respect to the window. The patterns of this specific embodiment are phase related so that when combined properly they will produce cardioid patterns to the front and rear of the vehicle.

The first pattern, right-left, and the second pattern, front-rear, may be processed and the direction of the unknown radio frequency signal transmission source determined.

BRIEF DESCRIPTION OF THE DRAWING

The invention will be readily understood in light of the description of the illustrative embodiment of the present invention which follows. In the drawings which form part of the disclosure, like reference numerals refer to like elements.

DESCRIPTION OF THE PREFERRED EMBODIMENT

Figure 1:
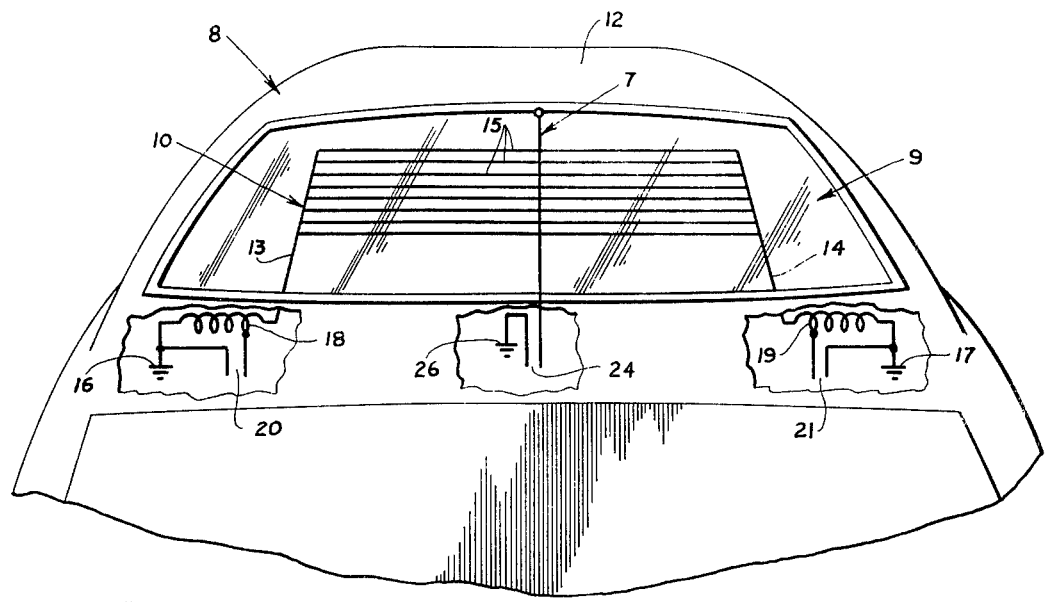
FIG. 1 illustrates a plan view of the preferred embodiment of the invention installed in a vehicle.

FIG. 1 illustrates the preferred embodiment of the rear window DF antenna. This includes both antenna 7, which has a figure eight front-rear pattern and antenna 10 which has right and left cardioid patterns at its respective outputs. It is shown mounted in the rear window 9 of vehicle 8. The antenna 10 consists of a left vertical wire spaced whip element 13 and a right vertical wire spaced whip element 14 extending from the base portion of the window 9 to substantially near the top portion of the window. Between the two vertical wire spaced whip elements 13 and 14 are a plurality of parallel wire horizontal cross connecting elements 15.

The antenna 10 impedance is a function of the width of the wires, the number of wires, and their relationship to the vehicle split ground plane, and is essentially constant over a wide frequency range. The desired impedance for an optimum antenna would be 50 ohms but the massive structure required would make this antenna too noticeable for undercover work. Consequently transformers 18 and 19 are required for an optimum impedance of 100 ohms. This reduces the structural mass considerably. To make the antenna inconspicuous, a thin flat wire, typically 0.040 inch width, is selected for the horizontal wires. That leaves the number of horizontal wires to be selected as a function of the relationship of the antenna to the split ground plane. The average is 6 to 10 for modern vehicles. The antenna occupies approximately 80% of the area of the vehicle's window opening and is equally spaced from the boundaries of the window by a margin of sufficient distance to minimize stray capacitance effects between the antenna and the automobile body in which the window is mounted. Parallel wire horizontal cross connecting elements extend from near the base of the window 9 to substantially near the top of the window in a horizontal plane. The larger the number and the wider the width of the parallel wire horizontal cross connecting members 15 that are used is a direct function of the lowering of the antenna impedance. Further, parallel wire horizontal cross connecting elements 15 function as delay lines between the left and right vertical wire spaced whip elements 13 and 14. Points 16, 17 and 26 are ground points to the vehicle body to establish ground plane for the antenna system and for the coax cable. Left and right vertical wire spaced whip elements 13 and 14 can either be connected through the two-to-one matching transformers 18 and 19 respectively to the output 20 and 21, or elements 13 and 14 can be connected directly to the outputs 20 and 21 with a 3 dB loss and a two-to-one increase in the SWR.

Figure 2:
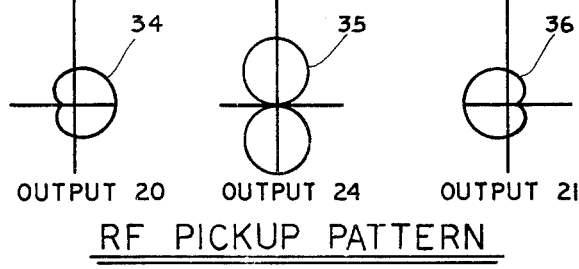
FIG. 2 illustrates the rf pick up pattern of the antenna with respect to the vehicle heading.

A second antenna installed in the rear window consists of a vertical wire element which is insulated electrically from the first antenna. This element 7 bisects the window opening. The upper end portion of this wire element is attached at point 12 to the vehicle 8 and the lower end portion is the output 24. Wire elements 7, 13, 14 and 15 may be of any suitable material falling into the above previous definition of wire. A suitable material is CIRCUIT-STICK manufactured in Torrance, California which is a flat copper wire element with an adhesive backing. Any suitable substitute may be used in lieu of CIRCUIT-STICK. The 0.1 inch width parallel vertical wire spaced whip elements 7, 13, and 14 and the 0.04 inch width parallel horizontal wire cross connecting elements 15 are applied onto the window with the existing adhesive backing of CIRCUIT-STICK. The width of the CIRCUIT-STICK does not critically effect the system; for example a 100% change in width, either plus or minus, would only necessitate the change in the number of horizontal cross wires by two, either subtract two or add two respectively. The joints of the parallel vertical wire spaced whip elements and parallel horizontal wire connecting elements can for and by way of example be soldered together so as to have electrical continuity, or be bonded together utilizing printed circuit cement. Another method that could be utilized is welding. In FIG. 2, the rf pick up patterns of each of the outputs 20, 24 and 21 are shown in 34, 35 and 36 respectively. These patterns are drawn with respect to the vehicle for the incoming direction of the rf transmitting source. These rf patterns represent the absolute voltage of the signals and they also have a quadrature phase relationship.

Figure 3:
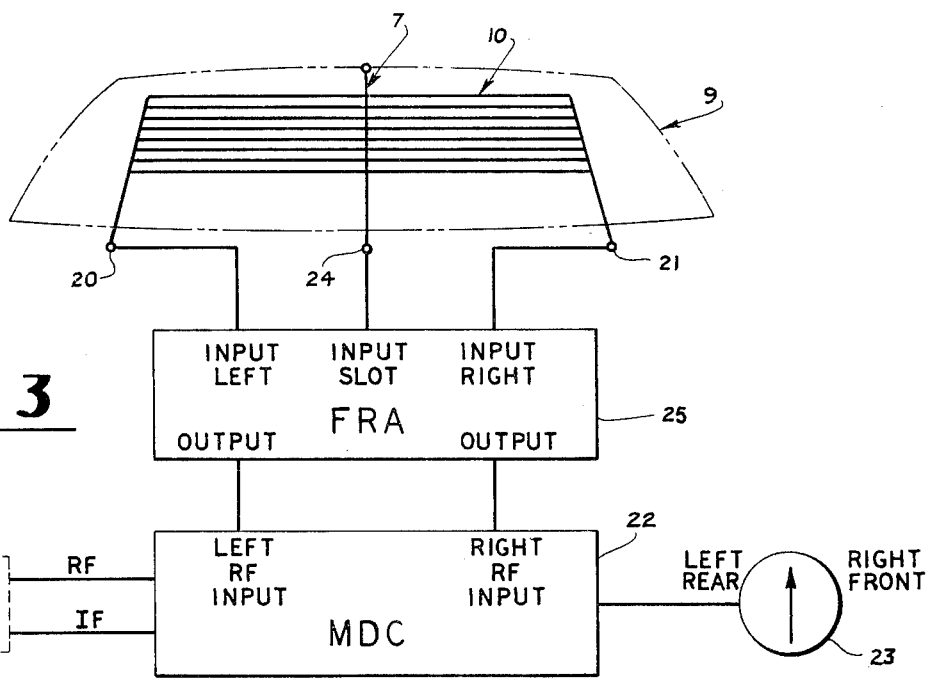
FIG. 3 illustrates the embodiment of the system.

FIG. 3 illustrates the operation of the DF antenna as a system; the outputs 20, 21 and 24 of the antenna 7 and 10 are processed by the FRA 25 which selects the patterns either right-left or front-rear. This directional information is then fed to the MDC 22. For example if the unknown rf transmission source is to the right and to the front of vehicle 8 with the FRA 25 in the front-rear mode, the indicator meter 23 will indicate front. Then the FRA 25 is switched to the left-right mode and the indicator meter 23 indicates right. With the use of this special DF antenna and FRA there is no ambiguity, equal to twice the meter 23 reading minus 180°, as in the earlier homing system. In a vehicle equipped with only a simple homing system the operator would have to turn the vehicle 8, ninety degrees in either direction to resolve the ambiguity.

The rear window DF antenna is insensitive to occupant in the vehicle 8 and to various surroundings. Further, antennas 10 and 7 are insensitive to ignition noise from other vehicles. The combination of this type of antenna and the surroundings in which the antenna is mounted gives a desired reduction in the rear field reception of electrostatic impluse noises from that which would be obtained with a simple whip antenna. The frequency coverage of the DF antenna is from approximately one to fifty megahertz with a constant uniform pattern. The lower frequency limit is determined by the gain and sensitivity of the direction finding receiving system 27 along with and including the field intensity of the source. The upper frequency limit of the DF antenna is determined and set by the characteristics of the window opening of the vehicle. The window opening 9 absorbs energy going to the antenna. The absolute gain is a function of the enclosed area between the parallel vertical wire spaced whip elements 13 and 14, and the size of the window opening.

Figure 4:
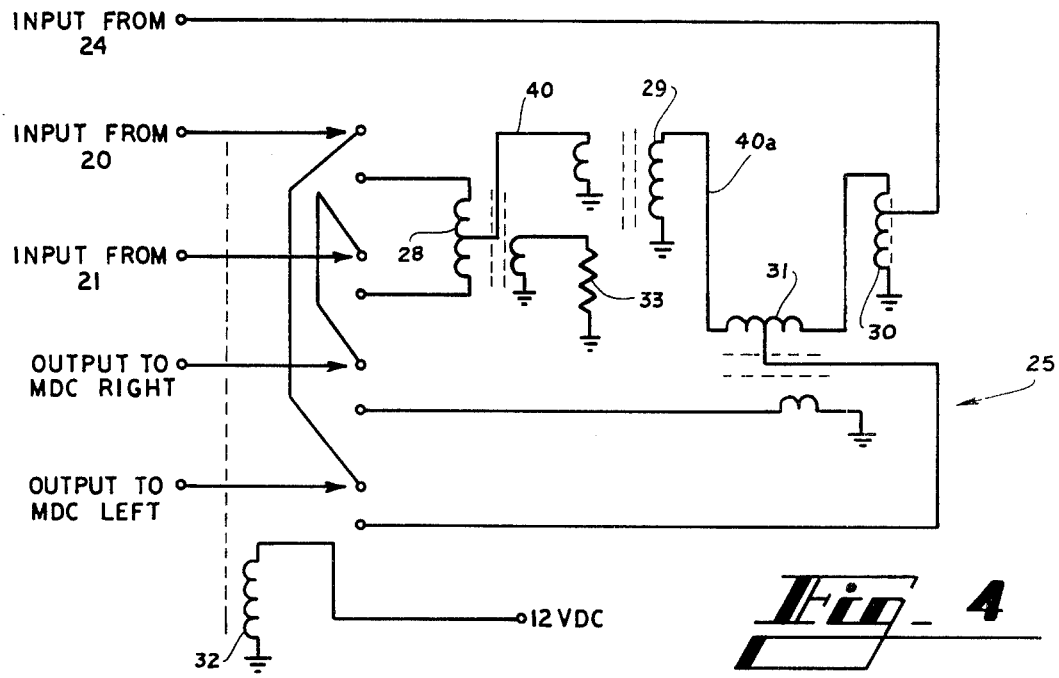
FIG. 4 illustrates the embodiment of the fore-aft switching and combining module.
Figure 5:
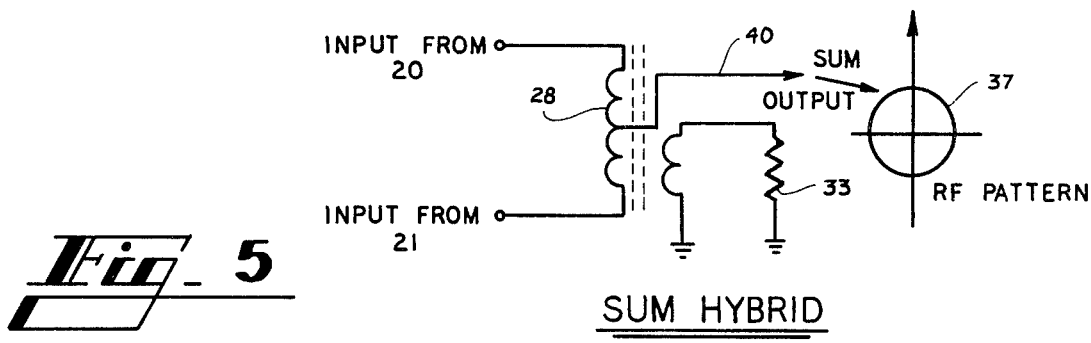
FIG. 5 illustrates the embodiment of the sum hybrid and the rf pattern at its output.
Figure 6:
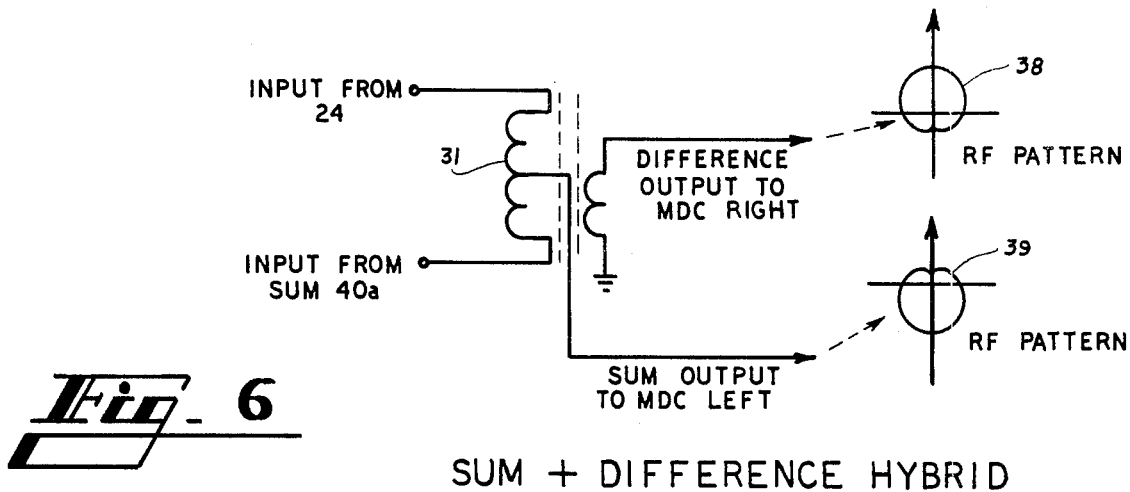
FIG. 6 illustrates the embodiment of the sum and difference hybrid and the rf pattern at its output.

In FIG. 4 the embodiment of the Front Rear Adapter 25 is illustrated in detail. The four-pole-double-throw relay 32 selects either the right-left or the front-rear mode of operation for the system. In the right-left mode of operation the relay is not powered and the rf signals from the antenna 10 at outputs 20 and 21 are fed straight through to the MDC 22 for processing. In the front-rear mode of operation the relay 32 is energized and the outputs 20 and 21 are combined in the hybrid 28 which is terminated in resistor 33, a 50 ohm termination. The combined output 40 is the sum output, which has a circular rf pattern 37, is now transformed in impedance from 50 to 100 ohms 40a by transformer 29 so as to match the input of the second hybrid 31. The third output 24, a figure eight pattern 35, from the DF antenna is also transformed up to one hundred ohms in transformer 30, to match hybrid 31. The hybrid 31 now adds and subtracts it's two inputs and produces rf patterns 38 and 39 the sum and difference respectively. The outputs are now fed to the MDC 22 for processing into front-rear directional information.

Various modifications are contemplated and may obviously be resorted to by those skilled in the art without departing from the spirit and scope of the invention, as herein defined by the appended claims, as only a preferred embodiment thereof has been disclosed. The antenna may be mounted in a window between two pieces of glass. It may be placed onto the window in an electroconductive form by silk screening or other obvious methods. While the preferred embodiment described herein refers to an antenna mounted on an automobile window, the principles of the invention are adaptable for use of the antenna on any particular surface whether it be a window or any other electromagnetic transparent surface in combination with a split ground plane. A split ground plane can be any vehicle which has a vehicle hood or trunk extension by and for way of example having a symmetrical sedan situation. The rear window DF antenna is affixed to the window 9 of vehicle 8 wherein the window is positioned between the roof 8 and trunk or hood extension. The number of parallel wire horizontal cross connecting elements for and by way of example can be eight on the average for a one hundred ohm impedance but may be any chosen number for any desired impedance.

What is claimed and desired to be secured by Letters Patents of the United States is:

1. A rear window DF antenna mounted on a window of a vehicle having a split ground plane comprising two parallel vertical wire spaced whip elements means spaced apart connected by a plurality of parallel horizontal wire delay line means, and a center vertical wire slot coupling means, insulated from the parallel horizontal wires.

2. The rear window DF antenna of claim 1 wherein said two parallel vertical wire spaced whip elements means function as two vertical antennas.

3. A rear window DF antenna of claim 2 wherein said horizontal wire delay line means connecting the said whip elements comprises six to ten wire elements that function as impedance loading.

4. A rear window DF antenna of claim 3 wherein said vertical wire slot coupling means is a single wire which bisects the window opening and is grounded to the vehicle at the top.

5. A rear window DF antenna of claim 4 wherein said horizontal wire delay line means occupies a larger horizontal dimension than a vertical dimension.

6. A rear window DF antenna of claim 5 wherein said vertical wires are 0.1 inch wide and said horizontal and slot elements are 0.04 inch wide.

7. A rear window DF antenna of claim 6 wherein said vertical wire antennas each have output at the bottom of the window.

8. A rear window DF antenna claim 7 wherein said antenna outputs may be connected to an impedance matching transformer at the base of the antenna.

9. A rear window DF antenna of claim 8 wherein said slot coupling means has an output at the bottom.

10. A rear window DF antenna of claim 9 wherein said antenna is equally spaced from the margins of said vehicle window to equalize capacitance.

* * * * *